US007001948B2

(12) United States Patent
Gupta et al.

(10) Patent No.: US 7,001,948 B2
(45) Date of Patent: Feb. 21, 2006

(54) POLYUREA COATING COMPOSITIONS

(75) Inventors: Laxmi C. Gupta, Los Alamitos, CA (US); Ashish Dhuldhoya, Chino Hills, CA (US)

(73) Assignee: American Polymer Corporation, Santa Fe Springs, CA (US)

( * ) Notice: Subject to any disclaimer, the term of this patent is extended or adjusted under 35 U.S.C. 154(b) by 646 days.

(21) Appl. No.: 10/145,325

(22) Filed: May 13, 2002

(65) Prior Publication Data

US 2003/0105220 A1    Jun. 5, 2003

Related U.S. Application Data

(63) Continuation-in-part of application No. 09/859,202, filed on May 16, 2001, now abandoned.

(51) Int. Cl.
*C08L 75/00*    (2006.01)
(52) U.S. Cl. .................................................. 524/871
(58) Field of Classification Search ................ 524/871
See application file for complete search history.

(56) References Cited

U.S. PATENT DOCUMENTS

| 5,126,170 A | 6/1992 | Zwiener et al. .......... 427/385.5 |
| 5,236,741 A | 8/1993 | Zwiener et al. .......... 427/385.5 |
| 5,405,218 A | 4/1995 | Hyde-Smith ................ 405/303 |
| 5,415,499 A | 5/1995 | Hyde-Smith et al. ........ 405/303 |
| 5,442,034 A | 8/1995 | Primeaux, II ................ 528/60 |
| 5,759,695 A | 6/1998 | Primeaux, II ............ 428/425.5 |
| 5,763,014 A | 6/1998 | Pickett .................... 427/430.1 |
| 5,879,501 A | 3/1999 | Livingston .................. 156/242 |
| 5,912,382 A | 6/1999 | Marquis et al. ............. 560/166 |
| 5,962,144 A | 10/1999 | Primeaux, II ............ 428/425.5 |
| 5,962,618 A | 10/1999 | Primeaux, II et al. ........ 528/61 |
| 6,013,755 A | 1/2000 | Primeaux, II et al. ........ 528/68 |
| 6,040,284 A | 3/2000 | Marquis et al. ............. 510/201 |
| 6,166,106 A | 12/2000 | Purgett et al. .............. 523/172 |

Primary Examiner—Edward J. Cain
(74) Attorney, Agent, or Firm—Kagan Binder, PLLC

(57) ABSTRACT

A polyurea coating layer is provided, which is the reaction product of an isocyanate composition and an amine composition. The isocyanate composition comprises isocyanate functional compounds selected from a first set of isocyanate compounds having an average isocyanate functionality of at least about 3 and having an equivalent weight of from about 180 to about 240. The first set of isocyanate compounds preferably are at least about 65% of the isocyanate compounds. The isocyanate composition has an average isocyanate functionality of at least about 2.5. The amine composition comprises amine functional compounds selected from a first set of secondary amine compounds having an equivalent weight of from about 200 to about 280 (preferably as about 50 to about 80% of the amine compounds), and a second set of secondary amine compounds having an equivalent weight of from about 30 to about 180 (preferably as about 20 to about 40% of the amine compounds). The amine composition has an average amine functionality of about 1.5 to about 2.5. The reactants are reacted under conditions such that the coating layer has a Hardness Value of at least about 70 D.

Methods of making the coating layer, kits for manufacture of coating layers, methods for making products incorporating coatings of the present invention, and products comprising coatings of the present invention are also provided.

40 Claims, No Drawings

POLYUREA COATING COMPOSITIONS

The present application is a continuation in part of U.S. patent application Ser. No. 09/859,202, filed May 16, 2001 now Abandon, the disclosure of which is incorporated herein by reference.

FIELD OF THE INVENTION

The present invention relates to polyurea coating compositions, methods for making same and coatings and articles made from same. More specifically, the present invention relates to polyurea coating compositions made from certain selected isocyanate and amine components.

BACKGROUND

Polyurea compositions have been used as components of liquid pavement marking compositions, as described in U.S. Pat. No. 6,166,106 to Purgett, et al. The binder of the pavement marking compositions described therein is prepared from a two-part system that includes an amine component and an isocyanate component. The composition described therein contains reflective elements to provide visibility and reflectivity to the pavement markings over an extended length of time. The amine and isocyanate components are chosen to provide a composition that is a liquid with a high solids content, has a generally rapid cure profile with a tack-free time of preferably no greater than about five minutes, and an open time of at least about 30 seconds to allow for adequate substrate wet out and particle or reflective element wicking/anchorage. Preferred amines include aspartic ester amines, as described in column 5, line 43 through column 7, line 10. A wide variety of isocyanates may be utilized in the pavement marking composition, as described beginning at column 7, line 11.

Polyurea spray compositions have also been used as elastomerically coating or lining materials. For example, U.S. Pat. No. 5,405,218 to Hyde-Smith discloses fast curing elastomeric materials that can be applied directly to existing concrete, brick, tile, mortar, and metal surfaces normally found in sewer manholes and catch basins. Similarly, U.S. Pat. No. 6,013,755 to Primeaux II, et al. discloses a method for preparation of polyurea elastomers comprising reacting an amine chain extender with dialkyl maleate to form an aspartic ester, wherein the chain extender has a molar amount of amine groups that is less than the moles of alkyl maleate; blending the aspartic ester with one or more polyoxyalkyleneamines to prepare a resin blend; and contacting the resin blend with an isocyanate under conditions effective to form a polyurea elastomer.

SUMMARY OF THE INVENTION

A polyurea coating layer is provided, which is the reaction product of an "A" side composition comprising isocyanate compounds and a "B" side composition comprising amine compounds. The isocyanate compounds on the "A" side are selected from a first set of isocyanate compounds having an average isocyanate functionality of at least about 3 and having an equivalent weight of from about 180 to about 240, preferably as at least about 65% of the total isocyanate compounds in the composition. The isocyanate composition has an average isocyanate functionality of at least about 2.5.

The B side composition comprises a mixture of amine compounds, wherein the amine compounds are selected from a first set of secondary amine compounds having an equivalent weight of from about 200 to about 280 (preferably as about 50 to about 80% of the total amine compounds in the composition), and a second set of secondary amine compounds having an equivalent weight of from about 30 to about 180 (preferably as about 20 to about 40% of the total amine compounds in the composition). The amine composition has an average amine functionality of from about 1.5 to about 3.

Alcohol compounds may also be present as a reactant in forming the coating layer of the present invention. These compounds preferably have an average alcohol functionality of at least about 3.0.

The resulting coating layer has a Hardness Value of at least about 70 D.

Methods of making the coating layer, kits for manufacture of coating layers, methods for making products incorporating coatings of the present invention, and products comprising coatings of the present invention are also provided.

DETAILED DESCRIPTION

The present invention provides a durable, flexible, high impact, easy to apply, and environmentally friendly polyurea coating material. By careful selection of the isocyanate component, in conjunction with selection of the amine component, highly beneficial properties of a novel polyurea coating material are obtained. The selection of these ingredients, together with selection of optional alcohol components, results in a highly durable coating that has low porosity and high hardness. Additionally, the selection of these components provides an environmentally friendly composition because it generates less than 10 g/l of VOCs, as determined by EPA Method 24. Preferably, the coating of the present invention generates less than 5 g/l of VOCs, and more preferably generates no VOCs as determined by EPA Method 24. Because of the careful selection of components in the composition, substantial safety benefits may also be realized by the present compositions. Thus, while protective masks, clothing and gloves are desirable for use during the mixing process to make coatings of the present invention, full ventilation masks and other expensive precautions may not be required or may be avoided completely due to the present invention. The ease and lower cost in generation of coatings according to the present intention provides substantial manufacturing benefit and environmental benefit to both the manufacturer and the public at large. The coating composition of the present intention surprisingly may be applied with excellent aesthetic results in an extremely easy manner. Because of the selection of the ingredients, the composition may be sprayed onto a surface, with result of a high density and hard surface previously only achievable through a lamination process utilizing heat and pressure. Thus, thin hard films may be easily prepared in an environmentally friendly manner.

As noted above, the "A" side reactant for preparing the coating layer of the present intention primarily comprises at least one isocyanate functional compound having an identified equivalent weight amount. Preferably, the first set of isocyanate compounds is selected from isocyanatoalkyl isocyanurate compounds, having an average isocyanate functionality of at least 3.0. The alkyl group of the isocyanatoalkyl isocyanurate may be straight, branched or cyclic alkyl C2–C12 groups. Preferably, the alkyl group is a straight or branched alkyl C4–C10 group. Most preferably, the isocyanatoalkyl isocyanurate compound is tris-isocyanato hexamethylene isocyanurate, commercially available from Rhodia Chemicals, TX under the trade designation "Tolonate HDT", or from Bayer Corp., Pittsburgh, Pa. under the trade designation "DESMODUR N-3300."

Alternatively or in addition, the first set of isocyanate compounds is selected from biurets of isocyanatoalkyl moieties. Preferably, the alkyl group of the isocyanatoalkyl moieties may be straight, branched or cyclic alkyl C2–C12 groups. More preferably, the alkyl group is a straight or branched alkyl C4–C10 group. Particularly preferred isocyanate functional compounds include the biuret of hexamethylene diisocyanate, commercially available from Bayer Corp., Pittsburgh, Pa. under the trade designation Desmondur N100 or from Rhodia Chemicals, TX under the trade designation HDB-LV. Additional biurets may comprise blends of compounds, such as biurets commercially available from Bayer Corp., Pittsburgh, Pa. under the trade designation Desmondur N3200.

A side compositions comprising mixtures of isocyanates satisfying the equivalent weight requirement as identified above are expressly contemplated.

The isocyanate functional reactant composition may additionally comprise one or more other isocyanates outside of the identified equivalent weight amount, in amounts such that they do not adversely affect the hardness of the final coating layer. Preferably, these additional isocyanates are polyisocyanates. The term "polyisocyanates" includes diisocyanates, triisocyanates, tetraisocyanates, etc., and mixtures thereof. Such polyisocyanates can be aliphatic, alicyclic, or aromatic in nature, or may be a combination of different isocyanate compounds. Because aromatic isocyanates tend to yellow or otherwise are adversely affected by weathering conditions, aliphatic isocyanates are preferred.

In a particularly preferred embodiment, the additional isocyanates that are provided in the isocyanate composition are isocyanate prepolymers that are the reaction product of alcohols and isocyanates. These prepolymers preferably are reacted with each other prior to incorporation in the A side reactant composition. Examples of such preferred prepolymer components include the reaction product of relatively low molecular weight polyisocyanate compounds, such as isophorone diisocyanate, with polypropylene oxide polyether polyols having a molecular weight from about 500 to about 3,000, and more preferably having a molecular weight from about 1,000 to about 2,000. Preferably, these prepolymer compositions are prepared with an excess amount of isocyanate compound, which further provides additional isocyanate functionality in the A side isocyanate composition.

Most preferably, the additional isocyanate compounds are present as no more than 40%, and more preferably no more than 25% of the total isocyanate of the isocyanate composition.

The amine reactant composition comprises at least two sets of secondary amine compounds, and has an average amine functionality of about 1.5 to about 3. It has been found that the use of the first class of secondary amine compounds together with a second class of secondary amines as discussed above provides the desired balance of reactivity, together with the desired physical properties of the end coating product.

The first set of secondary amine compounds are selected from amines having an equivalent weight of from about 200 to about 280. Mixtures of compounds from within this first set are specifically contemplated in compositions of the present invention. These amines may be aromatic or aliphatic amines, but are preferably are aliphatic amines. It has been found that aliphatic amines provide superior reactivity properties in the context of the first set of secondary amines, and further exhibit superior resistance to the adverse effects of weathering. Preferred secondary amines of the first class additionally comprise ester functionalities. Most particularly preferred secondary amines of the first class are selected from aspartic ester amines.

Preferred aspartic ester amines have the following formula (I):

$(R^2O_2C)(R^2O_2CCH_2)CHNH-R^1-NHCH(CO_2R^2)(CH_2CO_2R^2)$     I wherein $R^1$ is a divalent organic group (preferably, having 1–40 carbon atoms), and each $R^2$ is independently an organic group inert toward isocyanate groups at temperatures of 100° C. or less.

In the above formula (I), preferably, $R^1$ is an aliphatic group (preferably, having 1–40 carbon atoms), which can be branched, unbranched, or cyclic, and more preferably, $R^1$ is selected from the group of divalent hydrocarbon groups obtained by the removal of the amino groups from 1,4-diaminobutane, 1,6-diaminohexane, 2,2,4- and 2,4,4-trimethyl-1,6-diaminohexane, 1-amino-3,3,5-trimethyl-5-aminomethyl-cyclohexane, 4,4'-diamino-dicyclohexyl methane or 3,3'-dimethyl-4,4'-diamino-dicyclohexyl methane. Divalent hydrocarbon groups obtained by the removal of the amino groups from relatively high molecular weight polyether polyamines containing aliphatically bound primary amino groups, such as the products marketed under the trade designations "JEFFAMINE" by Texaco and Huntsman, and "HYCAR" by B. F. Goodrich, are also suitable. Other suitable polyamine precursors include ethylene diamine; 1,2-diaminopropane; 1,3-diaminopropane; 2,5-diamino-2,5-dimethylhexane; 1,11-diaminoundecane; 1,12-diaminododecane; 2,4- and/or 2,6-hexahydrotoluylene diamine; and 2,4'-diamino-dicyclohexyl methane. Aromatic polyamines such as 2,4- and/or 2,6-diaminotoluene and 2,4'- and/or 4,4'-diaminodiphenyl methane are also suitable but less preferred.

In the above formula (I), preferably, each $R^2$ is independently an organic group having 1–40 carbon atoms, more preferably, each $R^2$ is independently an alkyl group (preferably, having 1–20 carbons), which may be branched or unbranched, and most preferably, each $R^2$ is independently a lower alkyl group (having 1–4 carbon atoms).

Suitable aspartic ester amines are commercially available from Bayer (Pittsburgh, Pa.) under the trade designations "DESMOPHEN" NH 1420, and NH 1220, for example. "DESMOPHEN" NH 1420 is substantially composed of the compound according to Formula (I), wherein $R^1$ is a dicyclohexyl methane radical and $R^2$ is ethyl. "DESMOPHEN" NH 1220 is substantially composed of the compound according to Formula (I), wherein $R^1$ is hexylene and $R^2$ is ethyl. "DESMOPHEN" XP-7109 is substantially composed of the compound according to Formula (I), wherein $R^1$ is 2-methyl pentylene and $R^2$ is butyl.

The second class of secondary amines is selected from amine compounds having an equivalent weight of from about 30 to about 180. Preferably, the second class of secondary amines has an average functionality of greater than 2, and has a molecular weight of less than about 400. Mixtures of compounds from within this second set are specifically contemplated in compositions of the present invention. These amines may be aromatic or aliphatic amines, but are preferably are aliphatic amines. It has been found that aliphatic amines provide superior reactivity properties in the context of the second set of secondary amines, and further exhibit superior resistance to the adverse effects of weathering. These compounds are preferably selected from the group consisting of (cyclo)aliphatic diamines such as isophoronediamine; ethylenediamine; 1,2-propylenediamine; 1,3-propylenediamine; N-methyl-propylene-1,3-diamine; 1,6-hexamethylenediamine; 1,4-diaminocyclohexane; 1,3-diaminocyclohexane; N,N'-dimethylethylenediamine; and 4,4'-dicyclohexylmethanediamine for example, and aromatic diamines, such as 2,4-diaminotoluene; 2,6-diaminotoluene; 3,5-diethyl-2,4-diaminotoluene; and 3,5-diethyl-2,6-diaminotoluene for example; and primary, mono-, di-, tri- or tetraalkyl-substituted 4,4'-diamino-diphenylmethanes or amino alcohols such as ethanolamine; 1-aminopropanol; or 2-aminopropanol.

Particularly preferred secondary amines useful in this second set are bis alkyl diamino alkyl compounds. Most preferably, these compounds have the formula (II):

$$R^3-NH-R^4-NH-R^3 \quad (II)$$

wherein $R^3$ is lower alkyl and $R^4$ is an aliphatic moiety. Particularly preferred compounds of this formula are wherein $R^3$ is a $C_2$ to $C_6$ alkyl moiety, and $R^4$ is selected from an alkylene linking group and a bis cyclohexyl methane linking group. A most preferred compound is where $R^3$ is butyl and $R^4$ is a bis cyclohexyl methane linking group, commercially available as Clearlink™ 1000 diamine from UOP.

Additional amine compounds also may be incorporated in the amine composition, in amounts such that they do not adversely affect the hardness and reaction properties of the final coating composition. These amine-functional coreactants may be selected to balance the properties of the coating during the curing process and in its final form. For example, the use of such an amine-functional coreactant can contribute to the presence of soft segments in the polymer backbone for improved toughness properties. Preferably, coreactants are secondary amines, a blend of secondary amines, or a blend of secondary amines and primary amines. Some primary amines tend to react so rapidly that they are useful only in small quantities. In some instances, a significant amount of primary amines can be used, and the overall coating cure rate can be moderated or slowed down with the selection of a slower aspartic ester amine. Most preferably, the amine-functional coreactant comprises a secondary amine.

In one embodiment of the present invention, the amine-functional coreactant is preferably an amine-terminated polymer. Examples of such polymers include, but are not limited to, those available from Huntsman Chemical, under the trade designation "JEFFAMINE" polypropylene glycol diamines such as "JEFFAMINE" D-2000, those available from B. F. Goodrich, Cleveland, Ohio, under the trade designation "HYCAR" ATBN (amine-terminated acylonitrile butadiene copolymers), and those disclosed in U.S. Pat. No. 3,436,359 (Hubin et al.) and U.S. Pat. No 4,833,213 (Leir et al.) (amine-terminated polyethers, and especially polytetrahydrofuran diamines).

The amine reactant composition of the present invention may optionally include a small amount of monofunctional amine. The inclusion of such a monofunctional amine may improve the evenness of the cure, avoiding vitrefication and otherwise maintaining mobility all for reactant components throughout the cure process. The inclusion of monofunctional amine may therefore provide a better overall final coating matrix.

In one embodiment of the present invention, the coating layer may be the reaction product of reactants additionally comprising a polyfunctional alcohol in an amount of from about 0 to about 10% by weight based on total polyurea coating product weight. In this embodiment, preferably at least 50% of the alcohol compounds are selected from a first set of alcohol compounds having an equivalent weight of from about 50 to about 300, and more preferably from about 50 to about 160, said alcohol composition having an average alcohol functionality of at least about 3.0. Preferably, all of the alcohols present in the reaction composition have an average alcohol functionality of at least about 3.0. Preferred polyfunctional alcohols include ethylene glycol, diethylene glycol; triethylene glycol; dimethylolpropionic acid; sucrose; pentaerythritol; triethanol amine; glycerin; 1,6-hexanediol; N-methyl-N,N-diethanol amine; trimethylol propane; N,N,N',N'-tetrakis(2-hydroxypropyl)ethylenediamine; and the like. Preferably, the polyfunctional alcohol has a molecular weight and degree of functionality such that the polyfunctional alcohol is bound to the resin after reaction, and does not leach out from the ultimate coating. A particularly preferred polyfunctional alcohol is N,N,N',N'-Tetrakis(2-hydroxypropyl) ethylenediamine, commercially available as Quadrol from BASF.

The polyfunctional alcohol is preferably provided together with the amine composition, so that the coating may be made from a two-part system.

If alcohol is present in the composition, the reactants further comprise a catalyst for the reaction of the alcohol with the isocyanate. Suitable isocyanate/alcohol reaction catalysts include organometallic catalysts based on tin, bismuth, aluminum, zirconium iron, lead, mercaptides, and tertiary amines known in the polyurea industry. Particularly preferred catalysts include dioctyl tin mercaptide, commercially available as Fomrez UL-29, commercially available from Witco Corporation. In the case of two part reactant systems, preferably the alcohol and the catalyst are provided on the amine side of the system.

The amine, isocyanate and optional alcohol components of the coating composition are provided in a stoichiometric ratio to provide the desired physical properties of the final coating product, based on the specific properties of the individual chemicals used in the reaction process. Preferably, the isocyanate functionalities are provided in excess of the amine and optional alcohol functionalities. Preferably, the isocyanate:amine ratio is about 1:1 to about 2:1.

The amine and isocyanate components are preferably combined as a two part system in a volume ratio of preferably about 1:1. This ratio is most convenient for achieving the proper mixing of reactants. Alternative ratios may be chosen, depending upon the capabilities of the mixing equipment to be employed. Because complete mixing may be more challenging from an engineering perspective when the mix ratios of two components are not at a one-to-one ratio, volume ratios of one-to-one amine and isocyanate reactant compositions are generally preferred.

Additional components such as various additives can be used to achieve desirable results. For example, weathering additives such as UV absorbers, hindered amine light stabilizers, antioxidants, dispersing and grinding aids, wetting agents, impact modifiers, defoamers, suspension stabilizers, biocides, etc., can be added to the binder to improve the manufacturability and the overall durability of coatings of the present invention.

Coating compositions of the present invention comprising leveling additives are particularly preferred, because of the enhanced aesthetics that these additives may provide in the final product. Thus, leveling additives allow a coating to reach the required degree of flatness of the film surface and visual appearance. Poor surface flow can generate coating defects such as orange-peel effect, craters, brush marks or others. Commercially available leveling additives include special polyacrylates (solvent-free systems), cellulose acetobutyrate, selected modified polysiloxanes, fluorosurfactants and some slow solvents. Particularly preferred leveling additives comprise modified polydimethyl polysiloxane leveling additives.

Reactive compositions for making coatings of the present invention preferably comprise moisture scavengers to eliminate free moisture. It has been found that the desired reaction rates and properties of the ultimate coating products may be reliably attained in an improved manner by incorporation of moisture scavengers in the reactant compositions. Thus, when reactant compositions contain moisture scavengers, has been found to be significantly easier to provide a coating that is not adversely affected by the presence of moisture during the preparation of the coating product of the present invention. Most preferably, such moisture scavengers are provided in the B side (amine-containing) composition. Moisture scavengers include para-toluene sulfonyl isocyanate, molecular sieves, oxazolidine, and the like. Most preferably the moisture scavenger is a molecular sieve. Particularly preferred molecular sieves include molecular sieve 3A powder from UOP. Preferably moisture scavengers comprise 1–6% of the total coating, and most preferably 1–4% of the total coating.

The coating of the present invention additionally may comprise, pigments, fillers, extenders, diluents, plasticizers, and surfactants and surfactants, provided that they do not adversely affect the hardness, and reaction properties of the ultimate coating. Pigments impart desired visual appearance properties of the coating. Fillers, extenders, diluents and plasticizers can be used to modify viscosity and to balance the relative volumes of reactive compositions prior to reaction, and to modify flow properties of the liquid coating immediately after mixing of the reactive compositions and contribute to the bulk volume of the final coating with lower cost per volume materials.

The pigments, fillers, and extenders can have a significant impact on uncured formulation and cured film density, film cure profile and track-free time, cured film modulus, coating adhesion to a substrate, response to thermal cycling, possible shrinkage of polymer components, abrasion, and coating durability. Typically at least about 3 weight percent of the final dried coating is made up of pigments and fillers, and more preferably the final dried coating is made up 10–25% of pigments and fillers by weight. In some instances, about 25 weight percent to about 45 weight percent of pigments, fillers, and extenders can be used. Pigments are particularly preferably dispersed in a resin that is compatible with the present reactive compositions. More preferably, the pigment is dispersed in a resin that is reactive with one of the present reactive compositions, such as an amine resin. While pigments may optionally be supplied in a plasticizer, the incorporation of too much plasticizer may adversely affect the hardness of the ultimate coating. Pigments dispersed in reactive resins, such as amine functional polymers (such as the Jeffamine resins), are therefore preferred for use in the present systems.

It has been found that extremely hard fillers, such as silicon dioxide fillers, have an adverse effect on spray equipment used to prepare the coatings of the present invention. Surprisingly, softer fillers may be used with an increased Hardness Value being observed as compared to coatings that do not contain a filler. Preferably, the filler has a Moh's hardness of less than about 5, and more preferably less than about 3. Fillers preferably have a particle size of less than about 100 microns, and more preferably from about 5 to about 50 microns. Particularly preferred fillers include talc.

The coating layer has a Hardness Value of at least 70 D, and more preferably a Hardness Value of about 75 D to about 90 D. Hardness Value is determined by preparing a ¼ inch thick sample of the polyurea coating layer. Preferably, this thickness is generated by continuous spraying until the material achieves the desired thickness, without allowing intermediate layers to dry. A Hardness Value measurement is taken at least two days after coating, using the Shore D procedure described in ASTM Test D-2240. The coating of the present invention preferably has an elongation of less than 40%, more preferably less than 30%, and most preferably from about 10 to about 20%. A coating that exhibits excessive elongation tends to exhibit poor chemical resistance. A coating that exhibits insufficient elongation tends to crack and shatter.

The coating of the present invention preferably has a gloss of greater than 85, and more preferably greater than 90 when measured at 60 degrees by ASTM test D 523. Coatings capable of exhibiting high gloss are particularly aesthetically pleasing, and provide highly valued end products to the consumer.

An alternative embodiment of a top-coat composition includes two components, with the first or "A" component being a single compound and the second or "B" component being a separately prepared mixture. In particular, the first component is tris(isocyanatohexyl) isocyanurate, while the second component is a mixture of about 8–12 wt. % low-viscosity amine functional resin; about 1–3 wt. % isophorone diamine; about 0–1 wt. % dispersing additive of long chain alcohol polar acidic ester; about 12–18 wt. % titanium dioxide; about 15–20 wt. % ground silica; about 40–60 wt. % aliphatic diamine chain extender; about 1–3 wt. % alumina silicate; about 0–1 wt. % silicon dioxide; about 0–0.1 wt. % silicon antifoam; about 0–0.1 wt. % anti-cratering silicon surface additive; about 0–1 wt. % solvent-free acrylate leveling additive; about 0–1 wt. % hydroxyphenyl-benzotriazole ultraviolet absorber; about 0–1 wt. % sebacate light stabilizer; about 0–1 wt. % silane adhesion promoter; about 0–0.1 wt. % bismuth deconoate catalyst; about 0–0.1 wt. % ethylene diamine/propylene glycol catalyst; and about 0–0.1 wt. % dibutyltin dilaurate.

In use, the isocyanate composition, amine composition and alcohol compositions are combined in a manner suitable to facilitate mixing and reaction thereof, and to enable coating of the mixed compositions onto the desired substrate prior to completion of the reaction. Most preferably, these compositions are mixed together using a plural component mixing spray system, wherein the spray combines streams of the compositions with complete mixing by impingement, and simultaneous application of the mixed spray to the intended substrate. As noted above, preferably the alcohol composition is combined with the amine composition to simplify this process. An example of an airless, impingement mixing spray system is manufactured by Gusmer (1 Gusmer Drive, Lakewood, N.J. 08701-0110). The system will include the following components: a proportioning section which meters the components and increases the pressure to above about 1500 psi (10.34 MPa); a heating section to raise the temperatures of the components (preferably, independently) to control viscosity; and an impingement spray gun which combines the two components and allows mixing just prior to atomization. Alternatively, the spray system will comprise a short static mixing element at the end of the spray nozzle to assist in accomplishing complete mixing. Additional components, such as color components, may be provided as a third stream to be mixed with the two primary streams as appropriate. Other manufacturers of impingement systems include Glas-Craft (Indianapolis, Ind.).

Alternatively, the coating of the present invention may be prepared by mixing in a static mix device to achieve blending of the compositions. The system is similar to that of the impingement unit in that it meters, builds pressure, and heats the components. However, at the spray gun, the components are combined and pumped through a length of tubing which contains elements designed to mix the components prior to atomizing. This system requires periodic flushing of the static mix tube to prevent accumulation of cured polyurea, which could plug the spray gun.

Viscosity behavior of the each of the components is particularly important for two part spray coating processes. With impingement mixing, the two parts should be as close as possible in viscosity at high shear rates to allow adequate mixing and even cure. The plural component static mix/spray system appears to be more forgiving of viscosity differences between the two components. Characterization of viscosities as functions of shear rate and temperature can help with decisions as to starting point for temperatures and pressures of the coatings in the two part spray equipment lines. Preferably, the viscosity of the compositions is less than about 400 centipoise at 160° F. Alternatively, the viscosity may be adjusted at the time of mixing by heating one or both sides of the multiple part system prior to spray mixing. Thus, relatively high viscosity compositions may be provided, with viscosity adjustment being carried out by modification of temperature at the time of mixing. The viscosity is measured using a Brookfield viscometer, typically with a number 4 spindle, as appropriate for the particular composition being measured.

The compositions as described above are mixed together in a suitable manner, and applied to an intended substrate at a thickness of from about 3 to about 125 mils, and more preferably from about 5 to about 50 mils. Preferred ranges of thickness depend on the ultimate article to be manufactured. In a particularly preferred embodiment of the present invention, surprisingly uniform, hard and aesthetically pleasing coatings can be prepared using the compositions as described above, wherein the coating has a thickness of about 5 to about 12 mils, and more preferably about 6 to about 8 mils. Preferably, the application of the coating is carried out using a spray system, wherein multiple passes of the spray are uniformly applied until the desired thickness is achieved.

The compositions as described above are preferably formulated to provide a pot life of 3–30 seconds, and more preferably 8–12 seconds and an open time (i.e. time until the coating is tack free) of between about 30 seconds and 3 minutes, and more preferably between about 45 seconds and 2 minutes. Most preferably, the compositions as described herein are formulated to form a coating that is tack free in a time frame suitable for processing, wherein a subsequent layer of material such as a structural foam, may be applied to the coating composition for manufacture of a composite structure. Such subsequent layers preferably may be applied in less than 3 minutes, and more preferably less than 2 minutes, after generation of the coating layer of the present invention.

As indicated above, polyurea coating compositions of the present invention may be applied to any desired substrate. In one aspect of the present invention, the coating of the present invention is applied to a substrate for coating of that substrate as a topcoat. In this embodiment, the present invention provides a convenient laminate providing high strength without the need for conventional lamination techniques incorporating pressure and heat application. Thus, existing articles may be readily coated with a new and aesthetically pleasing coating. Examples of such articles include bathtubs, appliance surfaces, furniture such as tables and chairs, counter tops, boats, and the like. The coating of the present invention may also be used, for example, to provide a clean and readily cleanable surface on an existing structural element, such as walls, floors, and built-in furniture. Thus, a room may be advantageously provided with a completely refreshed and sealed surface by application of the coating of the present invention. This feature finds particular usefulness in preparing clean rooms for manufacturing of precision components or medical devices, and the like. The coating of the present invention thus may be applied to any appropriate material, such as wood, metal and resin-based substrates. Certain substrates, such as concrete, may benefit from pretreatment with a primer material, such as an epoxy or urethane primer.

In another aspect of the present invention, the coating of the present invention may be applied to a mold surface as a gelcoat, and allowed to cure with later removal of the mold to provide the shaped article created thereby. It has been found that the coatings of the present invention provide specific benefit as gelcoats, because the coatings are readily removed from the mold. While not being bound by theory, it is believed that the hardness properties of the coatings contribute to the ability to demold gelcoats of the present invention. Optionally, after allowing the coating as applied to the mold to become tack free, subsequent materials such as structural foams, may be applied thereto to provide a more rigid structure. Alternatively, a framework made from a more rigid material, such as metal, wood, fiber reinforced foam, cardboard or the like, may be fastened to the cured coating by adhesive, structural foam, mechanical fasteners, combinations of the above, and the like. The thus prepared gelcoat product preferably has at least sufficient rigidity to be readily removed from the mold. The ability to utilize a wide variety of materials in combination with the gelcoat of the present invention makes it possible to create aesthetically pleasing articles while achieving a high strength/low weight ratio. The present invention thus provides aesthetically pleasing articles in a low cost manufacturing system.

The following examples are offered to further illustrate the various specific and preferred embodiments and techniques. It should be understood, however, that many variations and modifications may be made while remaining within the scope of the present invention. For example, the particular materials and amounts thereof recited in these examples, as well as other conditions and details, are to be interpreted to apply broadly in the art and should not be construed to unduly limit the invention.

EXAMPLES

Examples 1–5

The components of Side A were provided as listed in Table 1, and mixed to provide a Side A composition according to the procedure as described below.

TABLE 1

| SIDE A | A1 | A2 | A3 | A4 | A5 |
|---|---|---|---|---|---|
| Isophorone diisocyanate | 8.57 | 10.97 | 13.02 | 15.08 | 12 |
| Diisononyl Phthalate | 3.57 | 4.57 | 5.43 | 6.28 | 5 |
| Polyol Propylene Polyether Polyol (1000 molecular weight) | 12.85 | 16.49 | 19.53 | 22.62 | 18 |
| Catalyst (Formez SUL-4) | 0.05 | 0.05 | 0.05 | 0.05 | 0.03 |
| Tolonal HDT | 75 | 68 | 62 | 56 | 65 |
| Viscosity @ 80 F. (CPS) | 1570 | 2000 | 2810 | 2200 | 2400 |

A prepolymer was prepared by first charging IPDI into a reactor, followed by addition of diisononyl phthalate, with mixing for 5–10 minutes. The polyol was then heated to 150° F., and added to this mixture. Catalyst was added with continued mixing, and the temperature of the reactor was increased to 220° F. The percentage of isocyanate was checked for complete reaction. After completing the prepolymer, Tolonate HDT was added, and the composition was packaged in an airtight container.

The components of Side B were provided as listed in Table 2, and mixed to provide a Side B composition according to the procedure as described below.

TABLE 2

| SIDE B | B1 | B2 | B3 | B4 | B5 |
|---|---|---|---|---|---|
| Jeffamine D-2000 | | | | | 18 |
| Clearlink 1000 | 20 | 20 | 20 | 20 | 20 |
| Disper Plast 1142 | 0.4 | 0.4 | 0.4 | 0.4 | 0.4 |
| Tronox CR-880 TiO2 | 15 | 15 | 15 | 15 | 15 |
| Silica (Minusil-10) | 18 | | | | |
| (Talc) MP-1250 | | | 18 | | |
| (Clay) Snowtex-45 | | 18 | | | |
| (Calcium Carbonate) Vicron 15-15 | | | | 18 | |
| Moisture Scavanger (Unisiv 3A powder) | 2 | 2 | 2 | 2 | 2 |
| Aerosil 972 (Fumed Silica) | 0.5 | 0.5 | 0.5 | 0.5 | 0.5 |
| Polyaspartic Ester (Desmophen NH 1220) | 40.3 | 40.3 | 40.3 | 40.3 | 40.3 |
| Isophorone Diamine | 2 | 2 | 2 | 2 | 2 |
| Deformer (Sag 47) | 0.02 | 0.02 | 0.02 | 0.02 | 0.02 |
| De-aerator (Byk 361) | 0.4 | 0.4 | 0.4 | 0.4 | 0.4 |
| UV Absorber (Tinuvin 1130) | 0.3 | 0.3 | 0.3 | 0.3 | 0.3 |
| UV Performance Enhancer (Tinuvin 292) | 0.6 | 0.6 | 0.6 | 0.6 | 0.6 |
| Catalyst A (Catalyst 315) | 0.06 | 0.06 | 0.06 | 0.06 | 0.06 |
| Catalyst B (Dabco 33 LV) | 0.06 | 0.06 | 0.06 | 0.06 | 0.06 |
| Catalyst (Formez SUL-4) | 0.03 | 0.03 | 0.03 | 0.03 | 0.03 |
| Adhesion Promoter (Silaquest A-187) | 0.4 | 0.4 | 0.4 | 0.4 | 0.4 |
| Total | 100 | 100 | 100 | 100 | 100 |
| Viscosity @ 80 F. (CPS) | 500 | 2200 | 3300 | 600 | 380 |

Amine resin was placed in the container, and dispensing agent was added thereto. This composition was mixed for 10 minutes, and TiO2 pigment was added thereto. This composition was mixed further until it became a smooth slurry. The remaining ingredients were then added in order, with continued mixing. After fine filtration, the resulting composition was packaged in an airtight container.

The above-described compositions were sprayed in an impingement sprayer, mixing the corresponding Side A with Side B and applying the mixture to a surface at a coating thickness of 35 mils. The resulting coating layers were evaluated. The resulting coating composition physical properties were measured, as reported in table 3.

TABLE 3

| Composition | A + B 1 | A + B 2 | A + B 3 | A + B 4 | A + B 5 |
|---|---|---|---|---|---|
| Pot Life @ 160 F. (seconds) | 15 | 12 | 11 | 14 | 7 |
| Tack Free Time @ 75 F. (seconds) | 100 | 105 | 115 | 120 | 95 |
| Hardness, ASTM D-2240 (Shore D) | 80 | 77 | 76 | 76 | 80 |
| Tensile, psi | 5978 | | 4989 | | 5145 |
| Elongation % | 11 | | 45 | | 41 |
| Gloss @ 60o | 94 | 95 | 94 | 95 | 94 |

The resulting coatings exhibited excellent hardness, elongation and tensile properties using a coating process that was extremely convenient to prepare using conventional equipment, and under reaction conditions that were very user-friendly.

Comparative Examples 6–8

The following comparative examples were prepared to demonstrate the properties of coating compositions that do not contain compounds of the first set of secondary amines (in the case of comparative examples 6 and 7) or that do not contain compounds of the second set of secondary amines (in the case of comparative example 8).

The components of Side A were provided as listed in Table 4, and mixed to provide a Side A composition according to the procedure as described below.

TABLE 4

| SIDE A | A6 | A7 | A8 |
|---|---|---|---|
| Isophorone diisocyanate | 12 | 12 | 12 |
| Diisononyl Phthalate | 5 | 5 | 5 |
| Polyol Propylene Polyether Polyol (1000 molecular weight) | 18 | 18 | 18 |
| Catalyst (Formez SUL-4) | 0.03 | 0.03 | 0.03 |
| Tolonal HDT | 65 | 65 | 65 |
| Viscosity @ 80 F. (CPS) | 2400 | 2400 | 2400 |

A prepolymer was prepared by first charging IPDI into a reactor, followed by addition of diisononyl phthalate, with mixing for 5–10 minutes. The polyol was then heated to 150° F., and added to this mixture. Catalyst was added with continued mixing, and the temperature of the reactor was increased to 220° F. The percentage of isocyanate was checked for complete reaction. After completing the prepolymer, Tolonate HDT was added, and the composition was packaged in an airtight container.

The components of Side B were provided as listed in Table 5, and mixed to provide a Side B composition according to the procedure as described below.

TABLE 5

| SIDE B | B6 | B7 | B8 |
|---|---|---|---|
| Jeffamine D-2000 | 15 | 21 | |
| Clearlink 1000 | 46 | 34 | |
| Disper Plast 1142 | 0.4 | 0.4 | 0.4 |
| Tronox CR-880 TiO2 | 15 | 15 | 15 |
| Silica (Minusil-10) | 20 | 20 | 15 |

TABLE 5-continued

| SIDE B | B6 | B7 | B8 |
|---|---|---|---|
| (Talc) MP-1250 | | | |
| (Clay) Snowtex-45 | | | |
| (Calcium Carbonate) Vicron 15-15 | | | |
| Moisture Scavanger (Unisiv 3A powder) | 2 | 2 | 2 |
| Aerosil 972 (Fumed Silica) | 0.5 | 0.5 | 0.5 |
| Polyaspartic Ester (Desmophen NH 1220) | | | 64 |
| Isophorone Diamine | | 6 | 2 |
| Deformer (Sag 47) | 0.02 | 0.02 | 0.02 |
| De-aerator (Byk 361) | 0.4 | 0.4 | 0.4 |
| UV Absorber (Tinuvin 1130) | 0.3 | 0.3 | 0.3 |
| UV Performance Enhancer (Tinuvin 292) | 0.6 | 0.6 | 0.6 |
| Catalyst A (Catalyst 315) | 0.1 | 0.1 | 0.06 |
| Catalyst B (Dabco 33 LV) | 0.1 | 0.1 | 0.06 |
| Catalyst (Formez SUL-4) | | | |
| Adhesion Promoter (Silaquest A-187) | 0.8 | 0.8 | 0.8 |
| Total | 100 | 100 | 100 |
| Viscosity @ 80 F. (CPS) | 190 | 380 | 350 |

Amine resin was placed in the container, and dispensing agent was added thereto. This composition was mixed for 10 minutes, and TiO2 pigment was added thereto. This composition was mixed further until it became a smooth slurry. The remaining ingredients were then added in order, with continued mixing. After fine filtration, the resulting composition was packaged in an airtight container.

The above-described compositions were sprayed in an impingement sprayer, mixing the corresponding Side with Side B and applying the mixture to a surface at a coating thickness of 35 mils. The resulting coating layers were evaluated. The resulting coating composition physical properties were measured, as reported in Table 6.

TABLE 6

| Composition | A + B 6 | A + B 7 | A + B 8 |
|---|---|---|---|
| Pot Life @ 160 F. (seconds) | 3 | 4 | 35 |
| Tack Free Time @ 75 F. (seconds) | 20 | 20 | 300 |
| Hardness, ASTM D-2240 (Shore D) | 75 | 75 | 66 |
| Tensile, psi | 3600 | 3898 | 2146 |
| Elongation % | 17 | 39 | 34 |
| Gloss @ 60o | 90 | 90 | 90 |

These comparative examples show that compositions without one of the desired sets of amines do not achieve the desired reaction profile and/or hardness of the ultimate coating layer.

Examples 9–12

The components of Side A were provided as listed in Table 7, and mixed to provide a Side A composition according to the procedure as described below.

TABLE 7

| SIDE A | A9 | A10 | A11 | A12 |
|---|---|---|---|---|
| Propylene Carbonate | 8 | | | |
| Tolonate HDT | 92 | 100 | 100 | |
| Tolonate HDB-LV | | | | 100 |
| Viscosity @ 80 F. (CPS) | 840 | 2400 | 2400 | 3000 |

Propylene carbonate and Tolonate HDT were mixed together and packaged in an airtight container.

The components of Side B were provided as listed in Table 8, and mixed to provide a Side B composition according to the procedure as described below.

TABLE 8

| SIDE B | B9 | B10 | B11 | B12 |
|---|---|---|---|---|
| Clearlink 1000 | 23.00 | 21.00 | 24.00 | 21.00 |
| Disper Plast 1142 | 0.40 | 0.40 | 0.40 | 0.40 |
| Tronox CR-880 TiO2 | 17.80 | 16.00 | | 16.00 |
| (Talc) MP-1250 | 10.00 | 9.50 | 9.50 | 9.5 |
| Moisture Scavanger (Unisiv 3A powder) | 6.00 | 5.50 | 5.50 | 5.50 |
| Aerosil 972 (Fumed Silica) | 0.50 | 0.50 | 0.50 | 0.50 |
| Polyaspartic Ester (Desmophen NH 1220) | 40.30 | 37.00 | 48.00 | 37.00 |
| Quadrol | 5.00 | 9.60 | 11.60 | 9.60 |
| Deformer (Sag 47) | 0.020 | 0.002 | 0.002 | 0.002 |
| Byk 333 | 0.09 | 0.09 | 0.08 | 0.09 |
| Deareator (Byk 361) | 0.40 | 0.40 | 0.37 | 0.40 |
| UV Performance Enhancer (Tinuvin 292) | 0.20 | 0.20 | 0.18 | 0.20 |
| Catalyst (Formez UL 29) | 0.05 | 0.05 | 0.20 | 0.05 |
| Byk 410 | | 0.40 | 0.60 | 0.40 |
| Total | 100 | 100 | 100 | 100 |
| Viscosity @ 80 F. (CPS) | 1110 | 1200 | 1150 | 1200 |

Amine resin was placed in the container, and dispensing agent was added thereto. This composition was mixed for 10 minutes, and TiO2 pigment was added thereto. This composition was mixed further until it became a smooth slurry. The filler was then added and dispersed until smooth. Moisture scavenger and fumed silica was added and dispersed, and then the remaining ingredients were added in order, with continued mixing. After fine filtration, the resulting composition was packaged in an airtight container.

The above-described compositions were sprayed in an impingement sprayer, mixing the corresponding Side with Side B and applying the mixture to a surface at a coating thickness of 35 mils. The resulting coating layers were evaluated. The resulting coating composition physical properties were measured, as reported in Table 9.

TABLE 9

| Composition | A + B 9 | A + B 10 | A + B 11 | A + B 12 |
|---|---|---|---|---|
| Pot Life @ 160 F. (seconds) | 9.00 | 8.00 | 8.00 | 11 |
| Tack Free Time @ 75 F. seconds | 120.00 | 60.00 | 60.00 | 60 |
| Hardness, ASTM D-2240 (Shore D) | 74.00 | 81.00 | 81.00 | 81 |
| Tensile, psi | 3200 | 4400 | 3720 | 4800 |
| Elongation % | 16 | 5 | 7 | 7 |
| Gloss @ 60° | 95 | 95 | 95 | 95 |

The resulting coatings exhibited excellent hardness, elongation and tensile properties using a coating process that was extremely convenient to prepare using conventional equipment, and under reaction conditions that were very user-friendly.

Example 13

An alternative coating composition comprising two components is prepared utilizing standard mixing procedure. In this composition, the first component is a single compound, 100 wt. % tris(isocyanatohexyl) isocyanurate (Rhone-Poulenc Corp., TOLONATE HDT). The second component of the second coating composition is prepared by combining about 10 wt. % low-viscosity amine functional resin (Bayer Corp., DESMOPHEN NH 1220); about a 2 wt. % isophorone diamine (Creanova Inc., VESTAMIN IPD); about 0.4 wt. % long chain alcohol polar acidic ester dispersing additive (BYK-Chemie USA, DISPERPLAST 1142); about 15 wt. % titanium dioxide (Keer-McGee Chemical LLC, CR-880); about 18 wt. % ground silica (U.S. Silica Co., MIN-U-SIL); about 50 wt. % aliphatic diamine chain extender (UOP Corp., CLEARLINK 1000 DIAMINE); about 2 wt. % alumina silicate (UOP Corp., Molecular Sieve Type 3A); about 0.5 wt. % silicon dioxide (Degussa Corp., AEROSIL R972); about 0.02 wt. % silicon antifoam (Osi Specialties Corp., SAG 47 Silicone Antifoam Compound); about 0.05 wt. % anti-cratering silicon surface additive (BYK-Chemie USA, BYK-333); about 0.4 wt. % solvent-free acrylate leveling additive (BYK-Chemie USA, BYK-361); about 0.3 wt. % hydroxyphenyl-benzotriazole ultraviolet absorber (Ciba Specialty Chemicals Corp., TINUVIN 1130); about 0.6 wt. % sebacate light stabilizer (Ciba Specialty Chemicals Corp., TINUVIN 292); about 0.4 wt. % silane adhesion promoter (Osi Corp., SILQUEST A-187 Silanes); about 0.06 wt. % bismuth deconoate catalyst (OM Group, Inc., CATALYST 315); about 0.06 wt. % ethylene diamine/propylene glycol catalyst (E.F. Whitmore & Co., DABCO 33-LV); and about 0.03 wt. % dibutyltin dilaurate catalyst (Witco Corp., FOMREZ SUL-4).

Upon completion of individual component blending, the two components ("A" & "B") of this embodiment are routinely combined and applied as a final top-coat finish and protectorant.

All patents, patent documents, and publications cited herein are incorporated by reference as if individually incorporated. Unless otherwise indicated, all parts and percentages are by weight. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A polyurea coating layer, which is the reaction product of the following reactants:
  a. an isocyanate composition comprising isocyanate functional compounds selected from a first set of isocyanate compounds having an average isocyanate functionality of at least about 3 and having an equivalent weight of from about 180 to about 240, said isocyanate composition having an average isocyanate functionality of at least about 2.5; and
  b. an amine composition comprising a first set of secondary amine functional compounds having an equivalent weight of from about 200 to about 280, and a second set of secondary amine compounds having an equivalent weight of from about 30 to about 180, said amine composition having an average amine functionality of about 1.5 to about 3;
said reactants being reacted under conditions such that the coating layer has a Hardness Value of at least about 70 D.

2. The polyurea coating layer of claim 1, wherein at least about 65% of the isocyanate compounds are selected from a first set of isocyanate compounds having an average isocyanate functionality of at least about 3 and having an equivalent weight of from about 180 to about 240; and wherein about 50 to about 80% of the amine compounds are selected from a first set of secondary amine compounds having an equivalent weight of from about 200 to about 280, and wherein about 20 to about 40% of the amine compounds are selected from a second set of secondary amine compounds having an equivalent weight of from about 30 to about 180.

3. The polyurea coating layer of claim 1, wherein the total isocyanate composition has an average equivalent weight of from about 190 to about 270, and the total amine composition has an average equivalent weight of from about 180 to about 210.

4. The polyurea coating layer of claim 1, wherein the reactants are reacted under conditions such that the coating layer has a Hardness Value of from about 75 D to about 90 D.

5. The polyurea coating layer of claim 1, wherein the isocyanate composition comprises isocyanate compounds selected from isocyanatoalkyl isocyanurate compounds, wherein the alkyl group is a straight, branched or cyclic alkyl C2–C12 group.

6. The polyurea coating layer of claim 1, wherein the isocyanate composition comprises isocyanate compounds selected from isocyanatoalkyl isocyanurate compounds, wherein the alkyl group is a straight or branched alkyl C4–C10 group.

7. The polyurea coating layer of claim 1, wherein the isocyanate composition comprises isocyanate compounds selected from isocyanatoalkyl isocyanurate compounds, wherein isocyanatoalkyl isocyanurate compound is trisisocyanato hexamethylene isocyanurate.

8. The polyurea coating layer of claim 1, wherein the isocyanate composition comprises isocyanate compounds selected from biurets of isocyanatoalkyl moieties.

9. The polyurea coating layer of claim 1, wherein the isocyanate composition comprises isocyanate compounds selected from biurets of isocyanatoalkyl moieties, wherein the alkyl group of the isocyanatoalkyl moieties are be straight, branched or cyclic alkyl C2–C12 groups.

10. The polyurea coating layer of claim 1, wherein the isocyanate composition comprises isocyanate compounds selected from biurets of isocyanatoalkyl moieties, wherein the alkyl group is a straight or branched alkyl C4–C10 group.

11. The polyurea coating layer of claim 1, wherein the first set of secondary amine compounds comprises compounds selected from aliphatic amines.

12. The polyurea coating layer of claim 1, wherein the first set of secondary amine compounds comprises compounds selected from secondary amine compounds comprising ester functionalities.

13. The polyurea coating layer of claim 1, wherein the first set of secondary amine compounds comprises compounds selected from aspartic ester amines.

14. The polyurea coating layer of claim 1, wherein the first set of secondary amine compounds comprises at least one compound selected from aspartic ester amines having the following formula

(R²O₂C)(R²O₂CCH₂)CHNH—R¹—NHCH(CO₂R²)(CH₂CO₂R²)   I wherein $R^1$ is a divalent organic group (preferably, having 1–40 carbon atoms), and each $R^2$ is independently an organic group inert toward isocyanate groups at temperatures of 100° C. or less.

15. The polyurea coating layer of claim 14, wherein in formula (I), $R^1$ is an aliphatic group (preferably, having 1–40 carbon atoms), which can be branched, unbranched, or cyclic; and each $R^2$ is independently an organic group having 1–40 carbon atoms.

16. The polyurea coating layer of claim 14, wherein in formula (I), $R^1$ is selected from the group of divalent hydrocarbon groups obtained by the removal of the amino groups from 1,4-diaminobutane, 1,6-diaminohexane, 2,2,4- and 2,4,4-trimethyl-1,6-diaminohexane, 1-amino-3,3,5-trimethyl-5-aminomethyl-cyclohexane, 4,4'-diamino-dicyclohexyl methane; 3,3'-dimethyl-4,4'-diamino-dicyclohexyl methane; ethylene diamine; 1,2-diaminopropane; 2,5-diamino-2,5-dimethylhexane; 1,11-diaminoundecane; 1,12-diaminododecane; 2,4- and/or 2,6-hexahydrotoluylene diamine; 2,4'-diamino-dicyclohexyl methane; 2,4-diaminotoluene; 2,6-diaminotoluene; 2,4'-diaminodiphenyl methane; and 4,4'-diaminodiphenyl methane; and each $R^2$ is independently an alkyl group (preferably, having 1–20 carbons), which may be branched or unbranched.

17. The polyurea coating layer of claim 14, wherein the first set of secondary amine compounds comprises at least one compound selected from the group consisting of the compound wherein $R^1$ is a dicyclohexyl methane radical and $R^2$ is ethyl, the compound wherein $R^1$ is hexyl and $R^2$ is ethyl, and the compound wherein $R^1$ is 2-methyl pentyl and $R^2$ is butyl.

18. The polyurea coating layer of claim 1, wherein the second set of secondary amine compounds comprises compounds selected from aliphatic amines.

19. The polyurea coating layer of claim 1, wherein the second set of secondary amine compounds comprises compounds selected from the group consisting of isophoronediamine; ethylenediamine; 1,2-propylenediamine; 1,3-propylenediamine; N-methyl-propylene-1,3-diamine; 1,6-hexamethylenediamine; 1,4-diaminocyclohexane; 1,3-diaminocyclohexane; N,N'-dimethylethylenediamine; 4,4'-dicyclohexyl-methanediamine; 2,4-diaminotoluene; 2,6-diaminotoluene; 3,5-diethyl-2,4-diaminotoluene; and 3,5-diethyl-2,6-diaminotoluene; primary, mono-, di-, tri- or tetraalkyl-substituted 4,4'-diamino-diphenylmethanes; ethanolamine; 1-aminopropanol; 2-aminopropanol; and mixtures thereof.

20. The polyurea coating layer of claim 1, wherein the second set of secondary amine compounds comprises compounds selected from the group consisting of compounds of the formula

$$R^3-NH-R^4-NH-R^3 \quad (II)$$

wherein $R^3$ is lower alkyl and $R^4$ is an aliphatic moiety.

21. The polyurea coating layer of claim 20, wherein $R^3$ is a $C_2$ to $C_6$ alkyl moiety, and $R^4$ is selected from an alkyl linking group and a bis cyclohexyl methane linking group.

22. The polyurea coating layer of claim 20, wherein $R^3$ is butyl and $R^4$ is a bis cyclohexyl methane linking group.

23. The polyurea coating layer of claim 1, wherein the reactants further comprise an alcohol composition, wherein at least 50% of alcohol compounds of said alcohol composition are selected from a first set of alcohol compounds having an equivalent weight of from about 50 to about 160, said alcohol composition having an average alcohol functionality of at least about 3.0; at least one of said reactants further comprising a catalyst for the reaction of the alcohol with the isocyanate.

24. The polyurea coating layer of claim 23, wherein the alcohol composition comprises a compound selected from the group consisting of ethylene glycol, diethylene glycol, triethylene glycol, dimethylolpropionic acid, sucrose, pentaerythritol, triethanol amine, glycerin, 1,6-hexanediol, N-methyl-N,N-diethanol amine, trimethylol propane, N,N,N',N'-tetrakis(2-hydroxypropyl)ethylenediamine, and mixtures thereof.

25. The polyurea coating layer of claim 23, wherein the alcohol composition comprises N,N,N',N'-Tetrakis(2-hydroxypropyl) ethylenediamine.

26. The polyurea coating layer of claim 23, wherein the alcohol composition is mixed with the amine composition prior to reaction with the isocyanate composition.

27. The polyurea coating layer of claim 23, wherein one of the compositions comprises an isocyanate/alcohol reaction catalyst is selected from the group consisting of organometallic catalysts based on tin, bismuth, aluminum, zirconium, iron, lead, mercaptides, and tertiary amines.

28. The polyurea coating layer of claim 1, wherein the compositions are mixed such that the isocyanate:amine ratio is preferably about 1:1 to about 2:1.

29. The polyurea coating layer of claim 1, wherein the coating layer comprises leveling additives selected from the group consisting of polyacrylates, cellulose acetobutyrate, selected modified polysiloxanes, and fluorosurfactants.

30. The polyurea coating layer of claim 1, wherein the coating layer comprises a moisture scavenger.

31. The polyurea coating layer of claim 30, wherein the moisture scavenger is selected from the group consisting of para-toluene sulfonyl isocyanate, molecular sieves, and oxazolidine.

32. The polyurea coating layer of claim 30, wherein the moisture scavenger is a molecular sieve.

33. The polyurea coating layer of claim 1, wherein the coating layer has an elongation of less than 40%.

34. Method of making a polyurea coating layer, comprising the steps of:
  a. Providing an isocyanate composition comprising isocyanate functional compounds selected from a first set of isocyanate compounds having an average isocyanate functionality of at least about 3 and having an equivalent weight of from about 180 to about 240, said isocyanate composition having an average isocyanate functionality of at least about 2.5; and
  b. Providing an amine composition comprising amine composition comprising a first set of amine functional compounds having an equivalent weight of from about 200 to about 280, and a second set of secondary amine compounds having an equivalent weight of from about 30 to about 180, said amine composition having an average amine functionality of about 1.5 to about 3;
  c. mixing the isocyanate and amine compositions and applying the resulting mixture to an intended substrate;
wherein said coating layer has a Hardness Value of at least about 70 D.

35. The method of claim 34, wherein said mixing is carried out in a static mixing device.

36. The method of claim 34, wherein said mixing is carried out in a spray mixing device.

37. The method of claim 34, wherein the compositions have a viscosity of less than 400 centipoise at 160° F.

38. The method of claim 34, wherein the coating layer is applied to the intended substrate in a layer from about 1 and 125 mils thick.

39. The method of claim 34, wherein the coating layer has a pot life from about 3 to about 30 seconds, and is tack free in from about 45 seconds to about 2 minutes.

40. The method of claim 34, wherein the coating layer has a pot life from about 8 to about 12 seconds.

* * * * *